Feb. 25, 1958  E. H. RIX ET AL  2,825,058
TARGET SIMULATOR FOR RADAR SYSTEM CHECKING
Filed Feb. 4, 1955
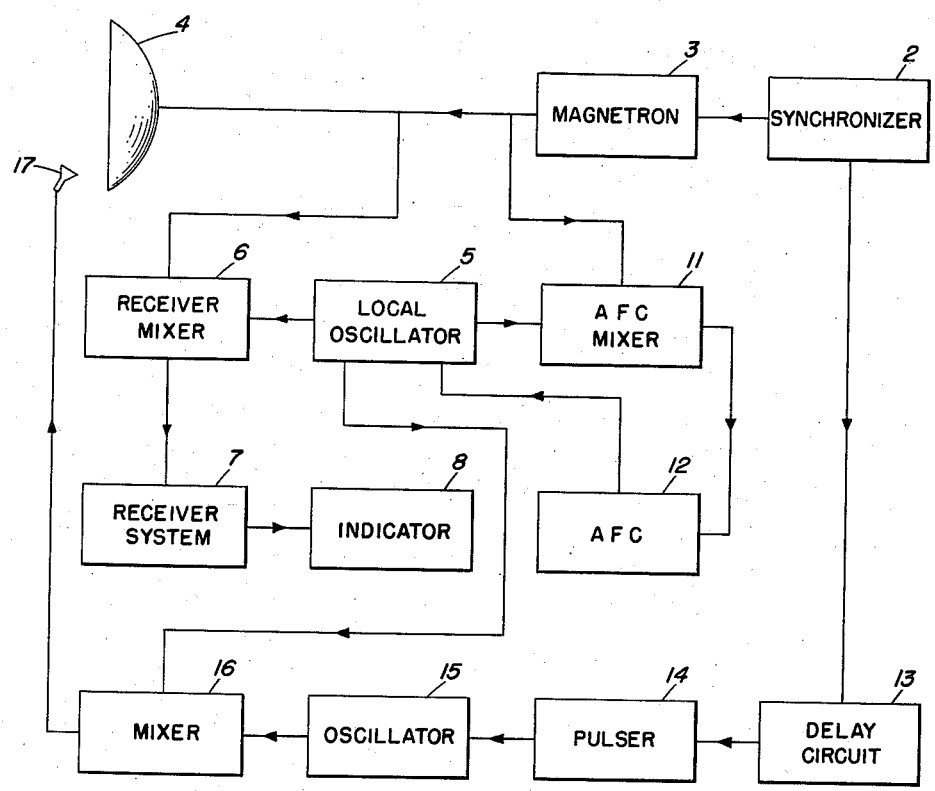
INVENTORS
EARL H. RIX
LEON W. RUSTAD
BY
ATTORNEYS

United States Patent Office 2,825,058
Patented Feb. 25, 1958

2,825,058

TARGET SIMULATOR FOR RADAR SYSTEM CHECKING

Earl H. Rix, Harmon, and Leon W. Rustad, Linthicum, Md., assignors, by mesne assignments, to the United States of America as represented by the Secretary of the Navy Application February 4, 1955, Serial No. 486,298

5 Claims. (Cl. 343—17.7)

The present invention relates to a target simulator for radar system checking and more particularly to a target simulator for radar system checking wherein the radar automatic frequency control also controls the frequency of the simulator output.

In the past the check-out of a radar system has been a rather laborious, time consuming task which involved the use of considerable portable test equipment. In most cases painstaking effort was required to set up the test program. The fact that such test equipment was of necessity bulky, usually precluded the possibility of testing the system in actual service conditions. Also, in prior systems, it has been necessary to include elaborate automatic frequency controls to maintain the frequency of the dummy target signal the same as the radar transmitter frequency. Other disadvantages included the extra cost of and space consumed by these elaborate automatic frequency controls.

The present invention is a test system which is built as an integral part of the radar set. An oscillator is provided, operating at the I. F. frequency of the system, to produce an output which is mixed with a signal of the system local oscillator. The resultant mixed signal is thus always the same as the radar transmitter frequency even if this latter frequency changes. The mixed signal is transmitted to a horn and is radiated back into the system antenna as a delayed target. Through the use of a portion of the radar system in the simulator circuit a minimum number of simulator circuit components are required, and as mentioned above the simulator signal will follow the transmitter frequency upon a change of the transmitter frequency. This latter feature is especially desirable for systems such as those employing sequential lobing where the radar transmitter frequency changes from pulse to pulse at a rapid rate.

Accordingly, an object of the present invention is the provision of a testing system for a radar set which is an integral part of the radar set.

Another object of the present invention is to provide a testing system for a radar set which is an integral part of the radar set and produces a signal which is similar to a radar echo signal.

A further aim of the present invention is the provision of a radar target simulator which is an integral part of the radar set and which produces a delayed signal that is the same frequency as the transmitted radar signal.

Other objects and many of the attendant advantages of this invention will be readily appreciated as the same becomes better understood by reference to the following detailed description when considered in connection with the accompanying drawings wherein:

The figure illustrates a block diagram of a preferred embodiment of apparatus employing the principles of the invention.

Referring to the drawing, there is shown a conventional radar system embodying a magnetron 3 which transmits a high frequency pulse to antenna 4 upon being triggered by a signal from synchronizer 2. In the receiver section a local oscillator 5 produces a signal which is mixed in receiver mixer 6 with the echo pulse received by antenna 4. A resultant mixed signal at the intermediate frequency (I. F.) is conducted to receiver system 7 which operates the indicator 8. An automatic frequency control mixer 11 is connected to mix portions of the output signals of the magnetron 3 and the local oscillator 5 to provide a signal for the automatic frequency control circuit for controlling the local oscillator 5. In the test circuit, the delay circuit 13 transmits a signal to pulser 14 an adjustable time after being triggered by a pulse from synchronizer 2. Oscillator 15 oscillates at the I. F. of the radar system upon being energized by the adjustable-width pulse output from pulser 14. The output of oscillator 15 and a portion of the output of local oscillator 5 are mixed in mixer 16 to produce a simulated target output that is fed to horn 17 for radiation into antenna 4. All of the functions performed by the radar system and test circuit components are well known, and it is apparent to one skilled in the art that there are many well-known circuits any of which could equally well be used as any of the others to perform each individual function. Some components that are typical of those that could be employed for a radar system transmitting at 9245 megacycles per second and having an I. F. of 30 megacycles per second are: a delay multivibrator for delay circuit 13; a ½ microsecond pulser for pulser 14; a 30 megacycle crystal controlled oscillator for oscillator 15; and a hybrid T mixer having a 1N23B crystal for mixer 16. It is obvious that these specific components are cited only as examples, and that the test circuit is not limited to the use of these components.

Simultaneously with the initiating triggering of the magnetron, the synchronizer starts the test circuit operation by a triggering of the delay circuit 13. After a delay, which at a minimum is equal to the recovery time of the receiver after the magnetron main bang, pulser 14 is operated by the output of delay circuit 13. Pulser 14 then energizes oscillator 15 by a pulse having a width equal to the width of the desired simulated echo signal. Oscillator 15, oscillating at the radar system I. F., produces an output signal of the desired width. A continuous wave from the local oscillator 5 is mixed with the output of oscillator 15 in mixer 16. As a result of the summation of the two input frequencies, one output signal of this mixer is a sideband signal having a frequency that is the same as the magnetron frequency and having a width equal to the width of the output of oscillator 15. This sideband signal is conducted via a wave guide or a coaxial cable to a horn 17 and is radiated back into the antenna as a delayed target. When this signal is received, mixed with the local oscillator and detected by the radar receiving system the resultant I. F. frequency will be exactly that of oscillator 15 since the local oscillator frequency that was added to the oscillator 15 output in mixer 16 is subtracted from the sum signal in mixer 6. This points out a prime feature of the invention. It has been necessary in previous target simulators to include elaborate automatic frequency controls to maintain the frequency of the dummy target signal the same as the radar transmitter frequency. For this invention no such circuits are required, the radar automatic frequency control also controls the frequency of the dummy target signal. This makes the simulator particularly useful for systems such as those employing sequential lobing where the radar transmitter frequency changes from pulse to pulse at a rapid rate. This requires the dummy target signal to do the same to properly simulate a target. Since the radar local oscillator frequency must shift in synchronism with the transmitter for proper operation of the radar receiving system, the simulator automatically fulfills the requirements.

A small, integral target simulator for radar system checking has been disclosed. It has also been shown how this particular simulator will always produce a signal that is equal in frequency to the radar transmitted signal, regardless of change of transmitter frequency.

Obviously many modifications and variations of the present invention are possible in the light of the above teachings. It is therefore to be understood that within the scope of the appended claims the invention may be practiced otherwise than as specifically described.

What is claimed is:

1. A target simulator for checking a radar system, said radar system having a synchronizer, local oscillator and antenna, the simulator comprising; pulse means connected to be triggered by the synchronizer for producing a delayed pulse of frequency equal to the radar system intermediate frequency, mixer means connected to receive a continuous wave signal from the local oscillator and a delayed pulse from said pulse means for producing a mixed pulse, and a horn positioned to radiate the mixed pulse into the system antenna as a delayed target.

2. A target simulator for checking a radar system, said radar system having a synchronizer, local oscillator and antenna, the simulator comprising; in combination a delay circuit connected to be triggered by the synchronizer for producing a delayed signal, a pulser connected to receive the delayed signal for generating a pulse of desired width, an oscillator for producing upon energization an output signal of frequency equal to the radar system intermediate frequency, means connecting said pulser to said oscillator whereby said oscillator is energized by the pulse generated by said pulser, a mixer connected to said oscillator and to the radar system local oscillator for producing a target pulse of width equal to the pulser output pulse width and of frequency equal to the radar transmitting frequency, and a horn positioned to radiate the target pulse into the antenna as a delayed target.

3. A target simulator for a radar system comprising in combination pulse means to produce a delayed pulse of width equal to the width of the desired target signal, an oscillator for producing upon energization an output signal of frequency equal to the radar system intermediate frequency, means connecting said pulse means to said oscillator whereby said oscillator is energized by the delayed pulse, mixing means connected to said oscillator for mixing the oscillator output with a continuous wave of frequency equal to the radar system local oscillator frequency whereby a target signal is produced having a frequency the same as the transmitted frequency of the radar system, and a horn positioned for radiating said target signal into the radar system antenna as a delayed target.

4. A target simulator for a radar system comprising: means for producing a pulse of a preselected width simultaneously with each firing of said radar system, means for delaying said pulse for a time sufficient to permit the receivers in said radar system to recover from a firing, means responsive to said delayed pulse for producing a wave having a width equal to said preselected width and a frequency equal to the radar system intermediate frequency, means for producing a mixed wave of said wave and the local oscillator signal of said radar system, and means for radiating said mixed wave into the radar system antenna.

5. A target simulator for a radar system comprising: means for producing a pulse after each firing of said radar system which is delayed for a time sufficient to permit the receivers in said radar system to recover from the firing, means responsive to said delayed pulse for producing a wave equal in width to said pulse and having a frequency equal to the radar system intermediate frequency, means for producing a mixed wave of said wave and the local oscillator signal from said radar system, and means for radiating said mixed wave into the radar system antenna.

References Cited in the file of this patent

UNITED STATES PATENTS 2,788,520  Arenberg _____ Apr. 9, 1957

FOREIGN PATENTS 593,539  Great Britain _____ Oct. 20, 1947